United States Patent
Zhu et al.

(10) Patent No.: US 10,473,770 B1
(45) Date of Patent: Nov. 12, 2019

(54) MULTI-PULSE FUSION ANALYSIS FOR LIDAR RANGING

(71) Applicant: DiDi Research America, LLC, Mountain View, CA (US)

(72) Inventors: Zhenghan Zhu, Mountain View, CA (US); Yue Lu, Mountain View, CA (US); Jihua Li, Mountain View, CA (US); John K. Wu, Mountain View, CA (US)

(73) Assignee: Didi Research America, LLC, Mountain View, CA (US)

( * ) Notice: Subject to any disclaimer, the term of this patent is extended or adjusted under 35 U.S.C. 154(b) by 0 days.

(21) Appl. No.: 16/232,973

(22) Filed: Dec. 26, 2018

(51) Int. Cl.
*G01C 3/08* (2006.01)
*G01S 7/487* (2006.01)
*G01S 17/93* (2006.01)
*G01S 17/10* (2006.01)

(52) U.S. Cl.
CPC .............. *G01S 7/487* (2013.01); *G01S 17/10* (2013.01); *G01S 17/936* (2013.01)

(58) Field of Classification Search
CPC ......... G01S 7/487; G01S 17/10; G01S 17/936
See application file for complete search history.

(56) References Cited

U.S. PATENT DOCUMENTS

| 5,760,887 | A | 6/1998 | Fink et al. |
| 5,896,425 | A * | 4/1999 | Hirano ................ H04L 5/0016 375/143 |
| 6,115,113 | A | 9/2000 | Flockencier |
| 2016/0003946 | A1 | 1/2016 | Gilliland et al. |
| 2017/0153319 | A1* | 6/2017 | Villeneuve ............. G01S 17/00 |
| 2018/0031703 | A1* | 2/2018 | Ngai ....................... G01S 17/10 |
| 2018/0259645 | A1 | 9/2018 | Shu et al. |

OTHER PUBLICATIONS

PCT/US2018/068065, "International Search Report and Written Opinion", dated Apr. 2, 2019, 9 pages.

* cited by examiner

*Primary Examiner* — Samantha K Abraham
(74) *Attorney, Agent, or Firm* — Kilpatrick Townsend & Stockton LLP (57) ABSTRACT

In some embodiments, a method for operating a light detection and ranging (LiDAR) system in an automobile provides a more accurate range estimate by combining multiple processed waveforms which are weighted according to their signal to noise ratios. At least one waveform is transmitted within a first time period, and reflected of an object. The reflected waveform is received and processed to improve the signal to noise ratio (SNR). The processing produces a higher number of output waveforms, such as through processing convolution. The SNR for each of the output waveforms is determined. An estimated range to the object from each output waveform is determined. The estimated ranges are then weighted according to their SNRs, and combined to provide an final determined range to the object.

20 Claims, 10 Drawing Sheets

MULTI-PULSE FUSION ANALYSIS FOR LIDAR RANGING

The following three U.S. patent applications listed below (which includes the present application) are being filed concurrently, and the entire disclosures of the other applications are incorporated by reference into this application for all purposes:

Application Ser. No. 16/232,973, filed Dec. 26, 2018, entitled "MULTI-PULSE FUSION ANALYSIS FOR LIDAR RANGING";

Application Ser. No. 16/232,977, filed Dec. 26, 2018, entitled "THREE-DIMENSIONAL LIGHT DETECTION AND RANGING SYSTEM USING HYBRID TDC AND ADC RECEIVER"; and Application Ser. No. 16/232,979, filed Dec. 26, 2018, entitled "MULTI-PULSE TECHNIQUE FOR IMPROVED DYNAMIC RANGE FOR INTENSITY INFORMATION IN LIDAR SYSTEMS.

BACKGROUND

Modern vehicles are often fitted with a suite of environment detection sensors that are designed to detect objects and landscape features around the vehicle in real-time that can be used as a foundation for many present and emerging technologies such as lane change assistance, collision avoidance, and autonomous driving capabilities. Some commonly used sensing systems include optical sensors (e.g., infra-red, cameras, etc.), radio detection and ranging (RADAR) for detecting presence, direction, distance, and speeds of other vehicles or objects, magnetometers (e.g., passive sensing of large ferrous objects, such as trucks, cars, or rail cars), and light detection and ranging (LiDAR).

LiDAR typically uses a pulsed light source and detection system to estimate distances to environmental features (e.g., vehicles, structures, etc.). In some systems, a laser or burst of light (pulse) is emitted and focused through a lens assembly and a reflection of the pulse off of an object is collected by a receiver. A time-of-flight (TOF) of the pulse can be measured from the time of emission to the time the reflection is received, which may manifest as a single data point. This process can be repeated very rapidly over any desired range (typically 360 degrees over a 2D plane for ground-based vehicles, and a 3D region for aircraft) to form a collection of points that are dynamically and continuously updated in real-time, forming a "point cloud." The point cloud data can be used to estimate, for example, a distance, dimension, and location of the object relative to the LiDAR system, often with very high fidelity (e.g., within 5 cm).

Despite the promise that LiDAR and other sensing systems bring to the continued development of fully autonomous transportation, there are challenges that limit its widespread adoption. LiDAR systems are often expensive, large, and bulky. In some cases, multiple emitters may be needed to accurate track a scene, particularly for systems that require accuracy over a large range and field-of-view (FOV). While significant strides have been made to push autonomous vehicle technology to greater commercial adoption, more improvements are needed.

BRIEF SUMMARY

In some embodiments, a method for operating a light detection and ranging (LiDAR) system in an automobile provides a more accurate range estimate by combining multiple processed waveforms which are weighted according to their signal to noise ratios. At least one waveform is transmitted within a first time period, and reflected of an object. The reflected waveform is received and processed to improve the signal to noise ratio (SNR). The processing produces a higher number of output waveforms, such as through processing convolution. The SNR for each of the output waveforms is determined. An estimated range to the object from each output waveform is determined. The estimated ranges are then weighted according to their SNRs, and combined to provide an final determined range to the object.

In certain embodiments, the processing comprises convolving the received waveforms with a replica(s) of the transmitted waveform(s) using a matched filter. The method may further include transmitting a burst of multiple waveforms, such as two or three waveforms. In one embodiment, each waveform is a pulse of identical shape and amplitude. Alternately, the shape and amplitude may be varied. In another alternate embodiment, the shape of the waveform is compared rather than the height of the peak.

In certain embodiments, a LiDAR system for a vehicle can include one or more processors; and one or more non-transitory computer-readable storage mediums containing instructions configured to cause the one or more processors to perform operations including a match filter processing, a signal to noise ratio calculation, a weighting by the SNR of the outputs of the match filter, and a fusion of the weighted results. The received signal will be detected in analog form, then digitized before being provided to the one or more processors.

BRIEF DESCRIPTION OF THE DRAWINGS

The detailed description is set forth with reference to the accompanying figures.

DETAILED DESCRIPTION

Aspects of the present disclosure relate generally to object and environment detection systems, and more particularly to LiDAR systems, according to certain embodiments.

In the following description, various examples of LiDAR-based systems using various multi-pulse fusion schemes are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

Figure 1:
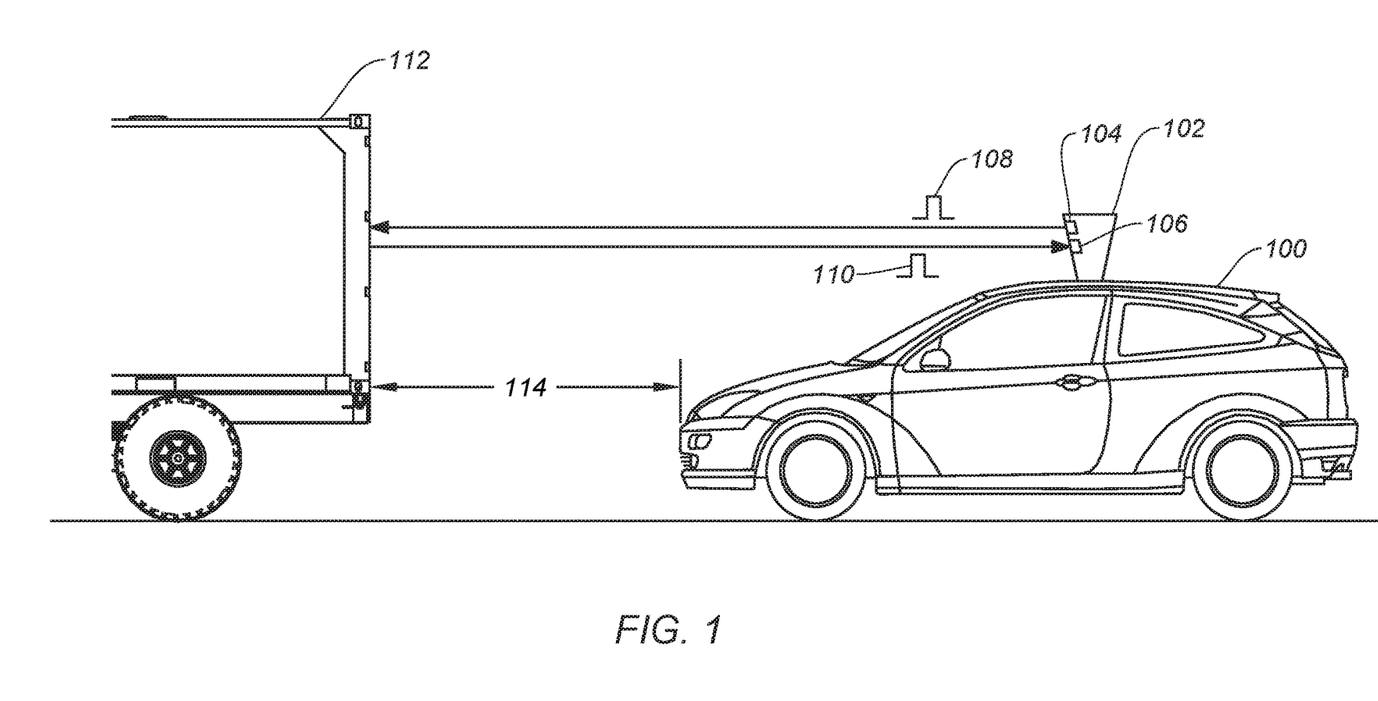
FIG. 1 shows a vehicle utilizing a LiDAR-based detection system, according to certain embodiments.

To following high level summary is intended to provide a basic understanding of some of the novel innovations depicted in the figures and presented in the corresponding descriptions provided below. Aspects of the invention relate to an improved mobile LiDAR-based range detection system, which may be mounted on a vehicle (e.g., automobile, unmanned aerial vehicle, etc.), as shown in FIG. 1. The LiDAR system (see, e.g., FIG. 2) may use a pulsed light source (e.g., focused light, lasers, etc.) and detection system to detect external objects and environmental features (e.g., vehicles, structures, etc.), determine the vehicle's position, speed, and direction relative to the detected external objects, and in some cases may be used to determine a probability of collision, avoidance strategies, or otherwise facilitate certain remedial actions, as further described below.

One of the problems that aspects of the present invention solves is the challenge of accurately estimating the range to an object, such as another car, roadside obstacle, etc. The estimated range depends upon accurately detecting the peak of a reflected pulse, so that the time of flight can be calculated from the time duration between the transmit time of the peak and the received time of the peak. A problem is that the presence of noise/interference and the limitation of analog-to-digital (ADC) resolution leads to error between where the peak actually occurs and where the peaks were recorded. The problem is exacerbated if the signal to noise ratio is low and/or when the ADC resolution is poor. One embodiment calculates the range from multiple peaks after passing through a matched filter, and uses a fusion calculation to do a weighted (by SNR ratio) combination of the estimate ranges to provide a more accurate estimated range.

Noise on such a signal can significantly affect where the peak of the signal is detected. Aspects of the invention solve this problem in different ways. For instance, some systems include a LiDAR detection scheme that processes a reflected pulse to improve the signal to noise ratio, such as by using a matched filter. A matched filter uses the transmitted pulse as a template to compare to the received signal. This is equivalent to convolving the unknown signal with a conjugated time-reversed version of the template. In one embodiment, reflected pulse is converted into the frequency domain for processing in the matched filter. The result is multiple frequency pulses for a received reflected pulse. If the frequency corresponding to the largest pulse is chosen as representing the peak, some information is lost. Accordingly, the signal to noise (SNR) ratio for each of the multiple pulses (frequencies) is measured. Each pulse is then used to calculate the range separately. The individual range calculations are then combined, with each one weighted according to the calculated SNR of its pulse/frequency, to provide a more accurate range determination.

In one embodiment the matched filter operates in the time domain. Specifically, the implementation of the matched filter filters the received data with a finite impulse response filter that has a coefficient sequence that is the conjugate reversal of the transmitted pulse(s). The SNRs of different peaks are represented by the amplitude of each peak divided by the noise variance, or equivalently, the noise root mean square (rms) value. The rms noise value is assumed to be the same for all peaks. In this embodiment, the definition of SNR is:

$$\text{SNR}=\text{peak\_value}/\text{noise\_rms\_value} \qquad \text{(Equation 1)}$$

In one embodiment, since the noise_rms_value is the same for all peaks that are to be fused, the peak values themselves can be used as the weights, since the noise_rms_value will cancel out in the fusion equation.

Figure 3:
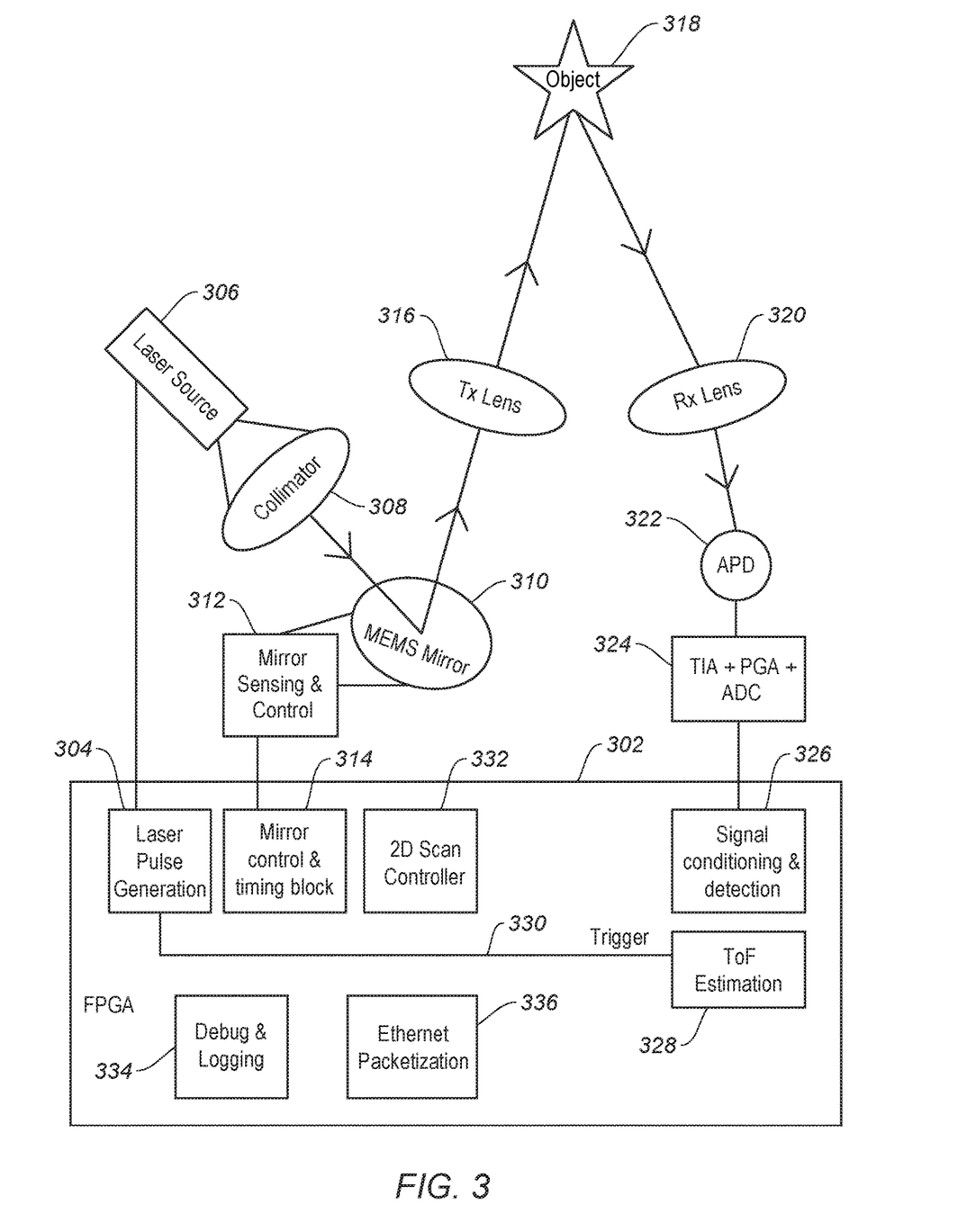
FIG. 3 is a block diagram of a range detection system implementing multi-phase fusion according to an embodiment of the invention.
Figure 4:
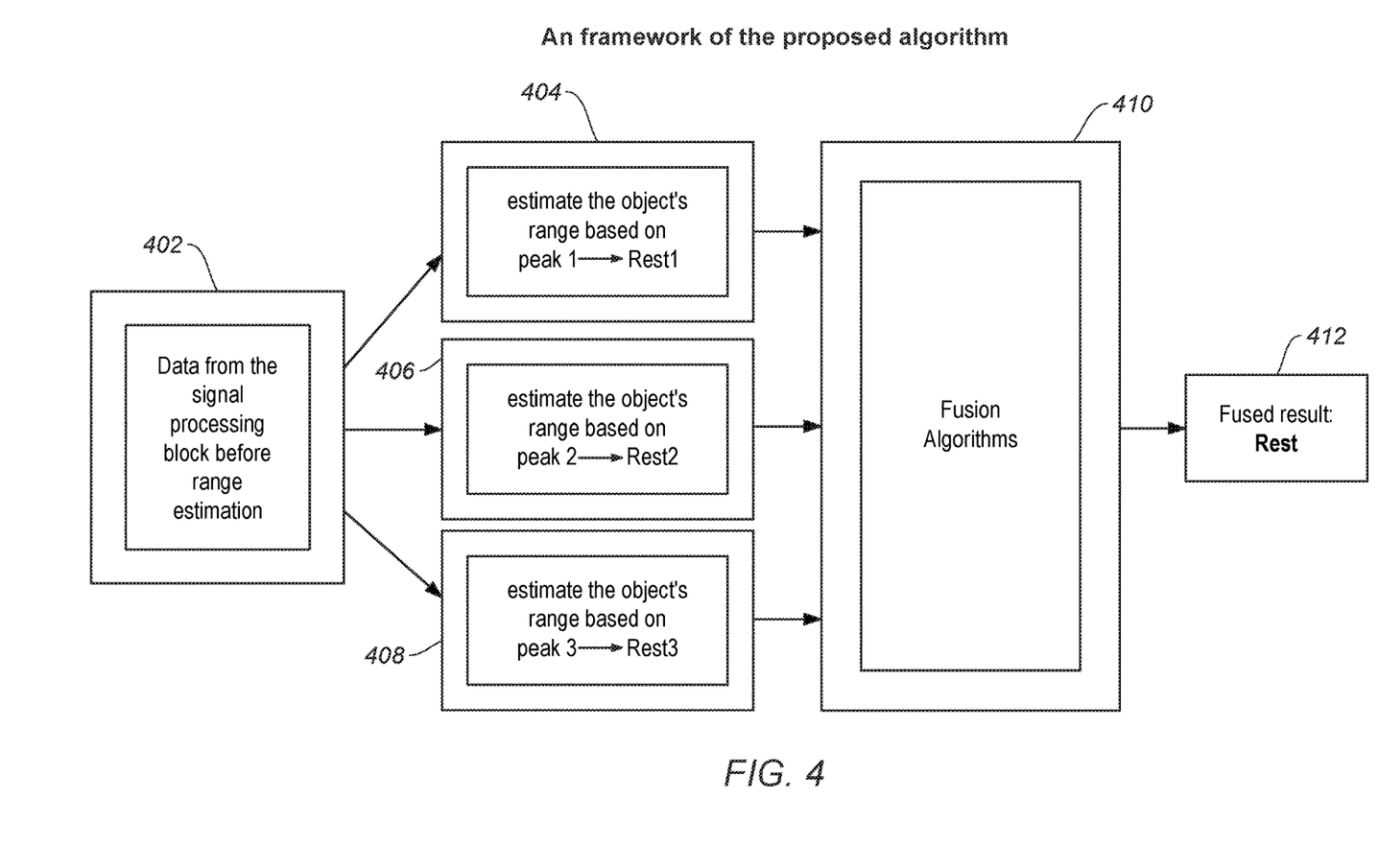
FIG. 4 is a block diagram of a ToF estimation module of FIG. 3, according to certain embodiments.

In one embodiment, matched filtering is also used in the signal processing prior to the fusion of the range estimations (in the block 402 in FIG. 4) to produce each peak of the matched filter output, E.g. peak 1, peak 2, peak 3 in FIG. 4. Matched filtering is also used for detection purposes in block 326 in FIG. 3. Embodiments of the present invention add the use of matched filtering in a fusion algorithm for TOF estimation (range estimation) in block 328 of FIG. 3 or more specifically block 410 in FIG. 4.

Typical System Environment for Certain Embodiments

FIG. 1 shows a vehicle 100 utilizing a LiDAR-based detection system, according to certain embodiments. Vehicle 100 can include a LiDAR module 102. LiDAR module 102 can allow vehicle 100 to perform object detection and ranging in a surrounding environment. Based on the result of object detection and ranging, vehicle 100 can, for example, maneuver to avoid a collision with the object. LiDAR module 102 can include an emitter module 104 and a receiver 106. Emitter module 104 can be configured to project one or more light pulses 108 at various directions at different times in any suitable scanning pattern, while receiver 106 can monitor for a return light pulse 110 which is generated by the reflection of light pulse 108 by an object. LiDAR module 102 can detect the object based on the reception of light pulse 110, and can perform a ranging determination (e.g., a distance of the object) based on a time difference between light pulses 108 and 110, which may be referred to as a time-of-flight. As indicated above, this operation can be repeated very rapidly over any desired range. In some cases, scanning (e.g., pulse emission and detection) may be performed over 360 degrees over a two-dimensional (2D) plane for ground-based vehicles (as vehicle detection systems may be primarily concerned with objects and environmental features on the ground), or over a three dimensional (3D) volumetric area for aircraft.

In some embodiments, a spinning mirror system (e.g., LiDAR module 102) may be used that can allow a single laser to aim over 360 degrees at a high rate of rotation (e.g., 500-5000 RPMs or more) over a single plane to form a collection of points (e.g., each point being an individual measurement such as one sent and reflected pulse) that are dynamically and continuously updated in real-time, forming a "point cloud." The point cloud data can be used to estimate, for example, a distance, dimension, and location of the object relative to the LiDAR system, often with a very high fidelity (e.g., within 2 cm). In some cases, a third dimension (e.g., height) may be performed in a number of different manners. For example, the spinning mirror system (or other suitable apparatus) can be moved up and down (e.g., on a gimbal or other actuating device) to increase the field of view (FOV) of the scan. Although not shown or discussed further, it should be understood that other LiDAR systems may be used to develop a point cloud and may incorporate the novel aspects of the various threshold-adjusted detection schemes described herein. For example, some scanning implementations may employ solid state, flash-based LiDAR units that can be configured to scan a 2D focal plane area. One of ordinary skill in the art with the benefit of this disclosure would appreciate the many alternative embodiments and modifications thereof.

Referring back to FIG. 1, LiDAR module 102 can transmit light pulse 110 (send signal) at a direction directly in front of vehicle 100 at time T1 and receive light pulse 110 (return signal) reflected by an object 112 (e.g., another vehicle) at time T2. Based on the reception of light pulse 110, LiDAR module 102 can determine that object 112 is directly in front of vehicle 100. Moreover, based on the time difference between T1 and T2, LiDAR module 102 can also determine a distance 114 between vehicle 100 and object 112, and may glean other useful information with additional received pulses including a relative speed and/or acceleration between the vehicles and/or dimensions of the vehicle or object (e.g., the width of the object in 2D, or a height and width (or portion thereof depending on the FOV) with 3D detection. Thus, vehicle 100 can adjust its speed (e.g., slowing or stopping) to avoid collision with object 112, or modulate systems such as adaptive cruise control, emergency brake assist, anti-lock braking systems, or the like, based on the detection and ranging of object 112 by LiDAR module 102.

Figure 2:
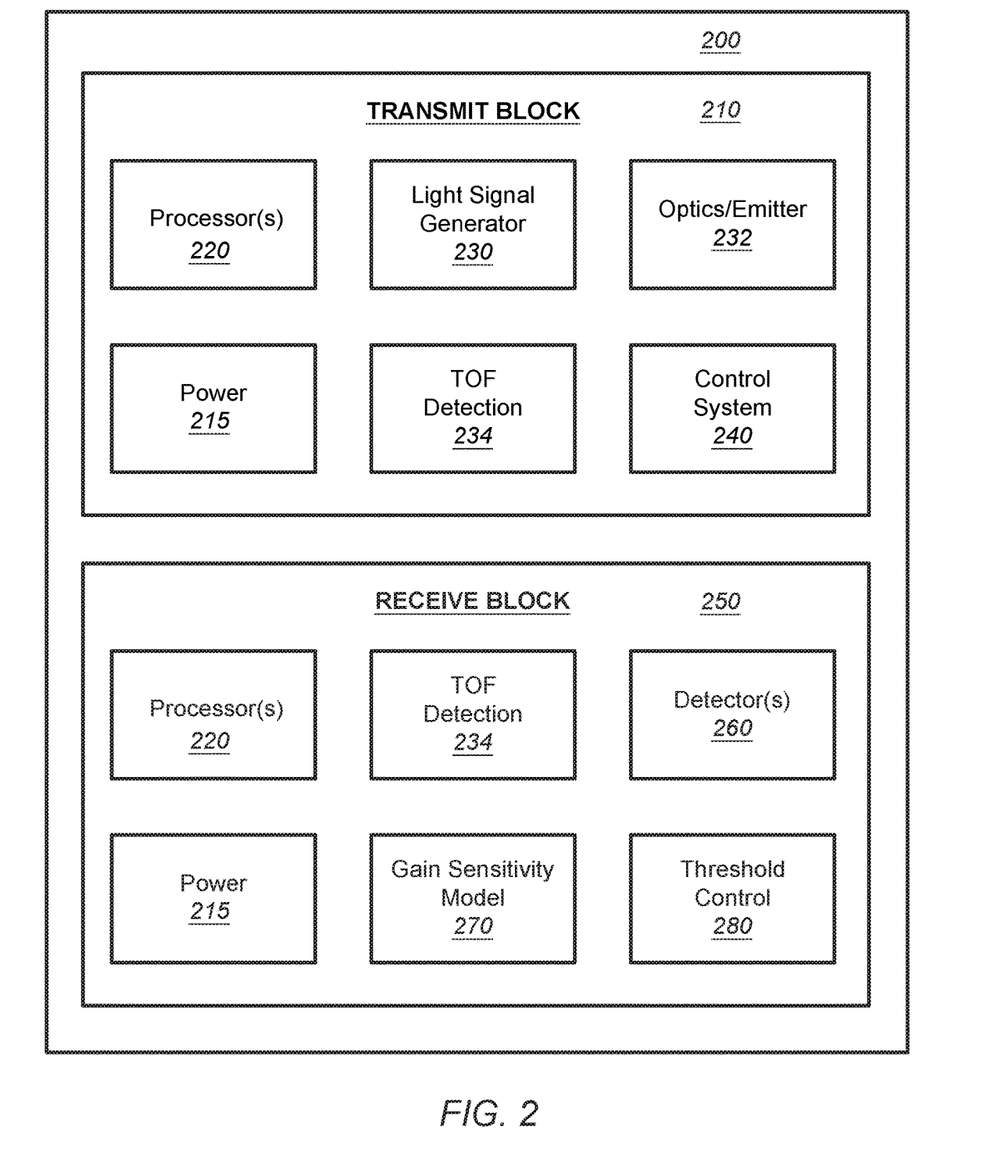
FIG. 2 shows aspects of a LiDAR-based detection system, according to certain embodiments.

FIG. 2 a simplified block diagram showing aspects of a LiDAR-based detection system 200, according to certain embodiments. System 200 may be configured to transmit, detect, and process LiDAR signals to perform object detection as described above. In general, a LiDAR system 200 includes one or more transmitters (e.g., transmit block 210) and one or more receivers (e.g., receive block 250). LiDAR system 200 may further include additional systems that are not shown or described to prevent obfuscation of the novel features described herein. In some embodiments, some or all aspects of LiDAR system 200 may be incorporated into any of the embodiments described herein.

Transmit block 210, as described above, can incorporate a number of systems that facilitate that generation and emission of a light signal, including dispersion patterns (e.g., 360 degree planar detection), pulse shaping and frequency control, TOF measurements, and any other control systems to enable the LiDAR system to emit pulses in the manner described above. In the simplified representation of FIG. 2, transmit block 210 can include processor(s) 220, light signal generator 230, optics/emitter module 232, power block 215, TOF module 234, and control system 240. Some of all of system blocks 220-240 can be in electrical communication with processor(s) 220. In some cases, LiDAR module 102 (of FIG. 1) may incorporate some or all of system 200 including transmit block 210, receive block 250, other LiDAR systems, or any combination thereof.

In certain embodiments, processor(s) 220 may include one or more microprocessors (µCs) and can be configured to control the operation of system 200. Alternatively or additionally, processor 220 may include one or more microcontrollers (MCUs), digital signal processors (DSPs), or the like, with supporting hardware, firmware (e.g., memory, programmable I/Os, etc.), and/or software, as would be appreciated by one of ordinary skill in the art. Alternatively, MCUs, µCs, DSPs, ASIC, programmable logic device, and the like, may be configured in other system blocks of system 200. For example, control system block 240 may include a local processor to certain control parameters (e.g., operation of the emitter). Processor(s) 220 may control some or all aspects of transmit block 210 (e.g., TOF module 234, optics/emitter 232, control system 240, etc.), receive block 250 (e.g., processor(s) 220) or any aspects of LiDAR system 200. In some embodiments, multiple processors may enable increased performance characteristics in system 200 (e.g., speed and bandwidth), however multiple processors are not required, nor necessarily germane to the novelty of the embodiments described herein. Alternatively or additionally, certain aspects of processing can be performed by analog electronic design, as would be understood by one of ordinary skill in the art.

Light signal generator 230 may include circuitry (e.g., a laser diode) configured to generate a light signal, which can be used as the LiDAR send signal, according to certain embodiments. In some cases, light signal generator 230 may generate a laser that is used to generate a continuous or pulsed laser beam at any suitable electromagnetic wavelengths spanning the visible light spectrum and non-visible light spectrum (e.g., ultraviolet and infra-red). In some embodiments, lasers are commonly in the range of 600-1200 nm, although other wavelengths are possible, as would be appreciated by one of ordinary skill in the art.

Optics/Emitter block 232 (also referred to as transmitter 232) may include one or more arrays of mirrors for redirecting and/or aiming the emitted laser pulse, mechanical structures to control spinning and/or moving of the emitter system, or other system to affect the system field-of-view, as would be appreciated by one of ordinary skill in the art with the benefit of this disclosure. For instance, some systems may incorporate a beam expander (e.g., convex lens system) in the emitter block that can help reduce beam divergence and increase the beam diameter. These improved performance characteristics may mitigate background return scatter that may add noise to the return signal. In some cases, optics/emitter block 232 may include a beam splitter to divert and sample a portion of the pulsed signal. For instance, the sampled signal may be used to initiate the TOF clock. In some cases, the sample can be used as a reference to compare with backscatter signals. Some embodiments may employ micro electromechanical mirrors (MEMS) that can reorient light to a target field. Alternatively or additionally, multi-phased arrays of lasers may be used. Any suitable system may be used to emit the LiDAR send pulses, as would be appreciated by one of ordinary skill in the art.

Power block 215 can be configured to generate power for transmit block 210, receive block 250, as well as manage power distribution, charging, power efficiency, and the like. In some embodiments, power management block 215 can include a battery (not shown), and a power grid within system 200 to provide power to each subsystem (e.g., control system 240, etc.). The functions provided by power management block 215 may be subsumed by other elements within transmit block 210, or may provide power to any system in LiDAR system 200. Alternatively, some embodiments may not include a dedicated power block and power may be supplied by a number of individual sources that may be independent of one another.

TOF module 234 may include a counter for measuring the time-of-flight of a round trip for a send and return signal. In some cases, TOF module 234 may be subsumed by other modules in LiDAR system 200, such as control system 240, optics/emitter 232, or other entity. TOF modules 234 may implement return "windows" that limit a time that LiDAR system 200 looks for a particular pulse to be returned. For example, a return window may be limited to a maximum amount of time it would take a pulse to return from a maximum range location (e.g., 250 m). Some embodiments may incorporate a buffer time (e.g., maximum time plus 10%). TOF module 234 may operate independently or may be controlled by other system block, such as processor(s) 220, as described above. In some embodiments, transmit block may not include a TOF detection module, as the receive block 250 may perform this function. One of ordinary skill in the art with the benefit of this disclosure would appreciate the many modification, variations, and alternative ways of implementing the TOF detection block in system 200.

Control system 240 may control aspects of light signal generation (e.g., pulse shaping), optics/emitter control, TOF timing, or any other function described herein. In some cases, aspects of control system 240 may be subsumed by processor(s) 220, light signal generator 230, TOF 234, or any block within transmit block 210, or LiDAR system 200 in general.

Receive block 250 may include circuitry configured to detect a process a return light pulse to determine a distance of an object, and in some cases determine the dimensions of the object, the velocity and/or acceleration of the object, and the like. Processor(s) 265 may be configured to perform operations such as processing received return pulses from detectors(s) 260, controlling the operation of TOF module 234, controlling threshold control module 280, or any other aspect of the functions of receive block 250 or LiDAR system 200 in general.

Detector(s) 260 may detect incoming return signals that have reflected off of one or more objects. In some cases, LiDAR system 200 may employ spectral filtering based on wavelength, polarization, and/or range to help reduce interference, filter unwanted frequencies, or other deleterious signals that may be detected. Typically, detector(s) 260 can detect an intensity of light and records data about the return signal (e.g., via coherent detection, photon counting, analog signal detection, or the like). Detector (s) 260 can use any suitable photodetector technology including solid state photodetectors (e.g., silicon avalanche photodiodes, complimentary metal-oxide semiconductors (CMOS), charge-coupled devices (CCD), hybrid CMOS/CCD devices) or photomultipliers. In some cases, a single receiver may be used or multiple receivers may be configured to operate in parallel.

Gain sensitivity model 270 may include systems and/or algorithms for determining a gain sensitivity profile that can be adapted to a particular object detection threshold.

Although certain systems may not expressly been discussed, they should be considered as part of system 200, as would be understood by one of ordinary skill in the art. For example, system 200 may include a bus system (e.g., CAMBUS) to transfer power and/or data to and from the different systems therein. In some embodiments, system 200 may include a storage subsystem (not shown). A storage subsystem can store one or more software programs to be executed by processors (e.g., in processor(s) 220). It should be understood that "software" can refer to sequences of instructions that, when executed by processing unit(s) (e.g., processors, processing devices, etc.), cause system 200 to perform certain operations of software programs.

The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled spring auto-adjustment, etc.) as described herein. Some software controlled aspects of LiDAR system 200 may include aspects of gain sensitivity model 270, threshold control 280, control system 240, TOF module 234, or any other aspect of LiDAR system 200.

It should be appreciated that system 200 is meant to be illustrative and that many variations and modifications are possible, as would be appreciated by one of ordinary skill in the art. System 200 can include other functions or capabilities that are not specifically described here. For example, LiDAR system 200 may include a communications block (not shown) configured to enable communication between LiDAR system 200 and other systems of the vehicle or remote resource (e.g., remote servers), etc., according to certain embodiments. In such cases, the communications block can be configured to provide wireless connectivity in any suitable communication protocol (e.g., radio-frequency (RF), Bluetooth, BLE, infra-red (IR), ZigBee, Z-Wave, Wi-Fi, or a combination thereof).

While system 200 is described with reference to particular blocks (e.g., threshold control block 280), it is to be understood that these blocks are defined for understanding certain embodiments of the invention and is not intended to imply that embodiments are limited to a particular physical arrangement of component parts. The individual blocks need not correspond to physically distinct components. Blocks can be configured to perform various operations, e.g., by programming a processor or providing appropriate processes, and various blocks may or may not be reconfigurable depending on how the initial configuration is obtained. Certain embodiments can be realized in a variety of apparatuses including electronic devices implemented using any combination of circuitry and software. Furthermore, aspects and/or portions of system 200 may be combined with or operated by other sub-systems as informed by design. For example, power management block 215 and/or threshold control block 280 may be integrated with processor(s) 220 instead of functioning as separate entities.

FIG. 3 is a block diagram of a range detection system implementing multi-phase fusion according to an embodiment of the invention. A Field Programmable Gate Array (FPGA) 302 implements a number of the digital electronic circuits as shown. A laser pulse generation module 304 generates a signal to initiate one or more laser pulses from a laser source 306. The laser beam from source 306 will diverge somewhat, and thus is collimated by a collimator 308. The collimated beam reflects off of a mirror 310, such as micro electromechanical mirrors (MEMS). MEMS mirror 310 is controlled by a mirror sensing and control module 312, under the control of a mirror control and timing block 314.

The collimated laser beam is reflected off MEMS mirror 310 to a transmission (Tx) lens 316. Tx lens 316 focuses the collimated beam to a desired search range, such as 3-30 meters. While the beam can reflect off closer or more distant objects, this is the range where the greatest accuracy is desired. The focused, collimated laser beam then reflects off an object 318. Object 318 may be another car, a guard rail, a curb, a pedestrian, or any other object. The reflected beam is passed through a receiver (Rx) lens 320. Rx lens 320 re-focuses the beam, which will have diverged over its flight path, to a detector in a detector module 322. Detector module 322 contains a light detector, such as an Avalanche Photo Diode (APD). A variety of other photodetectors could be used as well. The detected signal from APD 322 is provided to an analog processing module 324. Analog processing module 324 contains a Trans-Impedance Amplifier (TIA), an Analog to Digital Converter (ADC) and a Programmable Gain Amplifier (PGA). The PGA performs the function of amplifying the signal to a desired range.

Analog processing module 324 provides the detected, processed signal as a digitized signal to a signal conditioning and detection module 326 in the FPGA 302. Signal conditioning and detection module 326 performs the functions of conditioning the signals, including removing noise of high-frequency or low frequency components and matched filtering to detect possible signal peaks. The digitized output of module 326 is then provided to a Time of Flight (ToF) Estimation module 328. The details of ToF Estimation module 328 are shown in more detail in the FIG. 4 discussion below. ToF module determines the time of flight from when the laser pulse was emitted, as indicated by a trigger signal 330 from Laser Pulse Generation circuit 304. This signal can have a built-in delay to account for the delay between the output of Laser Pulse Generation Module 304 and when the laser beam will actually be emitted from laser source 306. Optionally, path delay from collimator 308 through MEMS mirror 310 may also be taken into account. Alternately, there may be no delay in the trigger, with any needed compensation applied in ToF Estimation module 328.

FPGA 302 also contains a 2D Scan Controller 332. This controls the movement of a detection assembly through 360 degrees or any other range of angles to detect objects. The detection assembly in one embodiment includes the MEMS mirror 310, Tx lens 316, Rx lens 320 and APD 322. Other combinations of moving and stationary elements may be used. Alternately, the entire system of FIG. 3 could be rotated.

FIG. 4 is a block diagram of a ToF estimation module of FIG. 3 according to an embodiment of the invention. A module 402 provides data from signal processing block 326 of FIG. 3. This data will have multiple peaks due to convolution through a digital matched filter, as discussed in more detail with respect to FIG. 5 below. FIG. 4 shows the example of 3 pulse peaks, although the number can vary depending on the implementation. The range to object 318 is estimated using the ToF calculation for each of the 3 peaks using modules 404, 406 and 408. This processing could be done in parallel, or alternately in series using a single module. The 3 ranges are provided to a fusion algorithm module 410, which combines the multiple range estimations with different weightings to produce a fused result 412.

Figure 5:
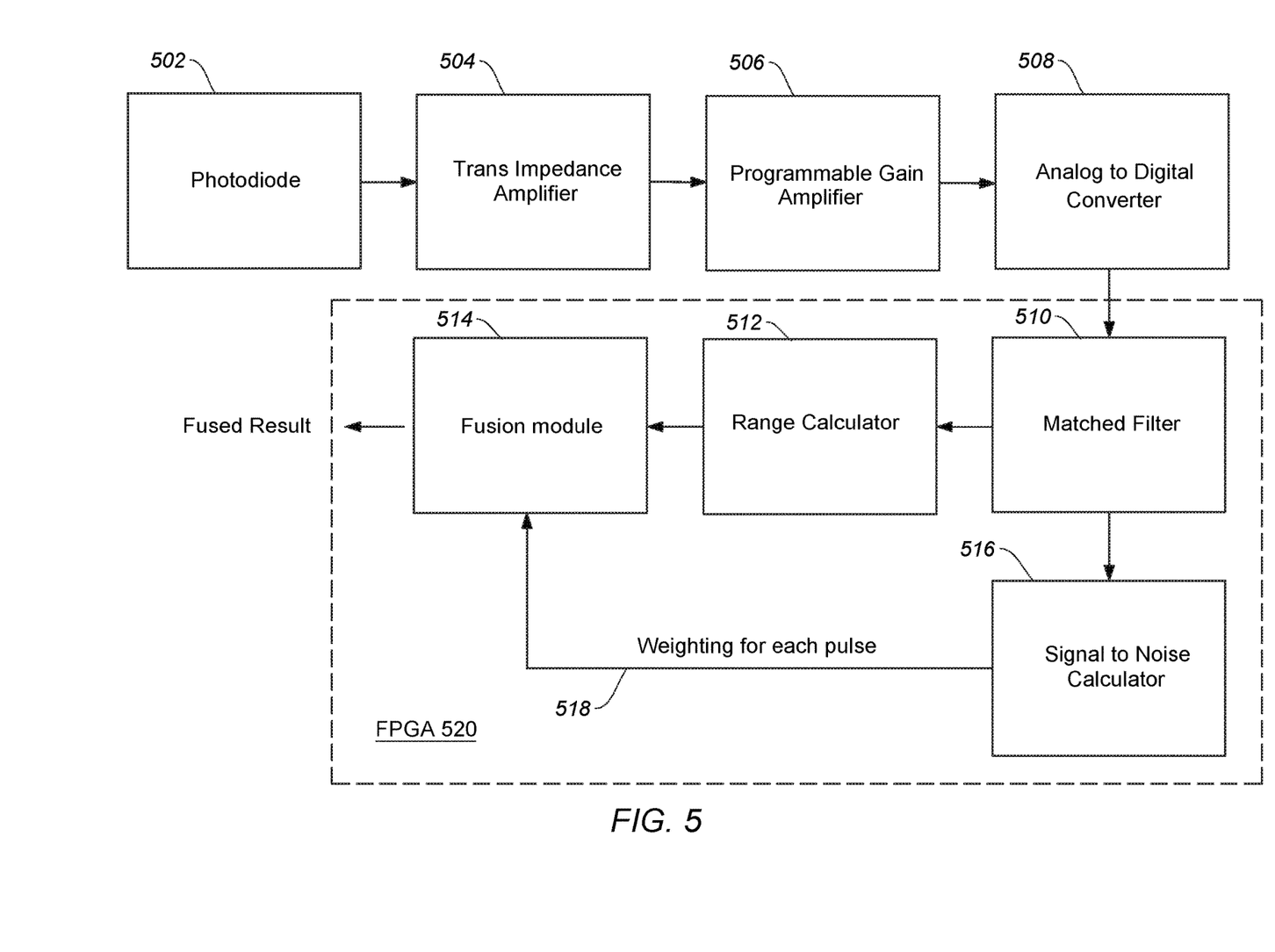
FIG. 5 is a block diagram of the received signal portion of the electronics of FIGS. 3-4, according to certain embodiments.

FIG. 5 is a block diagram of the received signal portion of the electronics of FIGS. 3-4 according to an embodiment of the invention. A photodiode 502 provides the detected signal to Trans Impedance Amplifier 504 and then to Programmable Gain Amplifier 506. An Analog to Digital converter 508 then converts the signal into digital form. The digitized signal is then provided to a matched filter 510, which provides an output possibly having more peaks than the input. The extra peaks are due to the intrinsic operation of the matched filter 510. Matched filter 510 uses the transmit pulse to convolute with the received signal, which will produce more peaks as the result of convolution. The output of the matched filter is provided to a range calculator 512, which calculates the range for each peak using a ToF calculation. The multiple range calculations are then provided to a fusion module 514. A Signal to Noise Ratio (SNR) calculator 516 determines the SNR for each peak, and provides those values as weightings 518 to fusion module 514. Fusion module then combines the ranges from the multiple peaks, as weighted by their respective SNR, to give a weighted result. In one embodiment, Matched Filter 510, Range Calculator 512, Fusion Module 514 and Signal to Noise Calculator 516 are implemented in a Field Programmable Gate Array (FPGA) 520.

In one fusion embodiment with 3 peaks, the final estimated range Rest is given by:

$$Rest = (SNR1*Rest1 + SNR2*Rest2 + SNR3*Rest3)/(SNR1 + SNR2 + SNR3) \quad \text{(Equation 2)}$$

Where SNR1 is the signal-to-noise ratio (SNR) of peak 1, SNR2 is for peak 2 and SNR3 is for peak3. This algorithm weights the results from different peaks according to the quality of the information contained in the peaks, which is represented by the peaks' SNR. This leads to an optimal solution in the sense of maximizing the SNR of the fused result. Clearly, the specific fusion algorithm is not limited to the one represented in (1). It can vary according to different cost function design. The inventors have experimentally determined that by using an SNR weighted, fused result, and improvement in accuracy in the range calculation over just using the main peak is achieved.

Alternately, in other embodiments the SNR can be combined with the estimated range calculation in other ways. For example, an alternative Rest1 can be determined by the middle point of the rising edge of peak 1, denoted as Rr, and the middle point of the falling edge of the peak 1, denoted as Rf. Then (Rr+Rf)/2 is used as Rest1. However, SNR1 is still employed. The difference lies in that the Rest1, Rest2, Rest3 are no longer determined from peak1,2,3. Instead they are estimated from the rising and falling edge of the peak1, 2,3, with the resulting peak heights being combined to give a weighted combination peak which is then used to calculate range. In another alternate embodiment, Rest1, Rest2, Rest3 are obtained by using an edge detection method without employing a matched filter.

Figure 6:
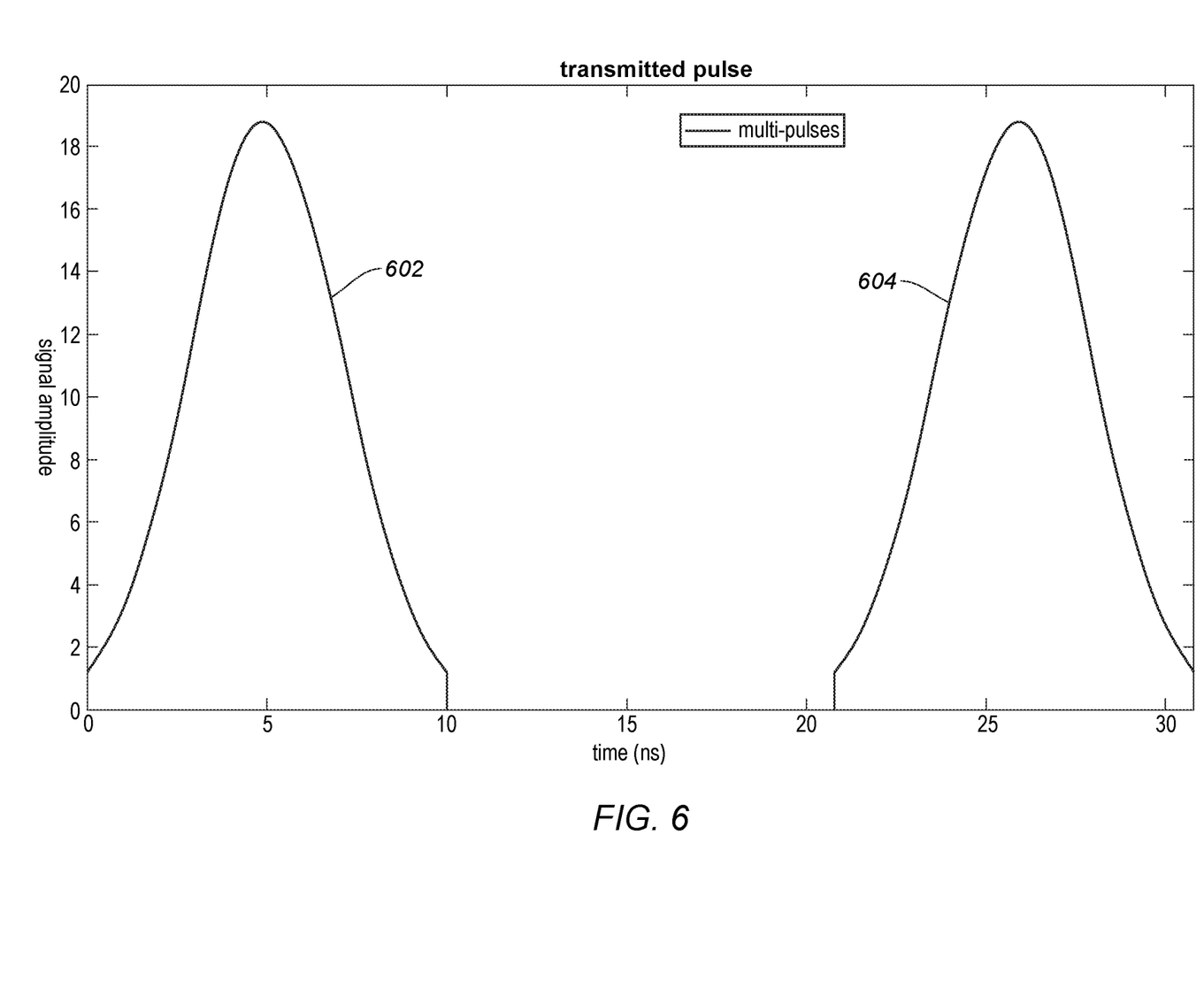
FIG. 6 is a graph of a multi-pulse laser pulse transmission, according to certain embodiments.

FIG. 6 is a graph of a multi-pulse laser pulse transmission according to one embodiment. Instead of a single pulse, a burst of two or more pulses is used. FIG. 6 shows the signal amplitude along the Y axis, and the time in nanoseconds (ns) along the X axis. Two pulses 602 and 604 are transmitted.

Figure 7:
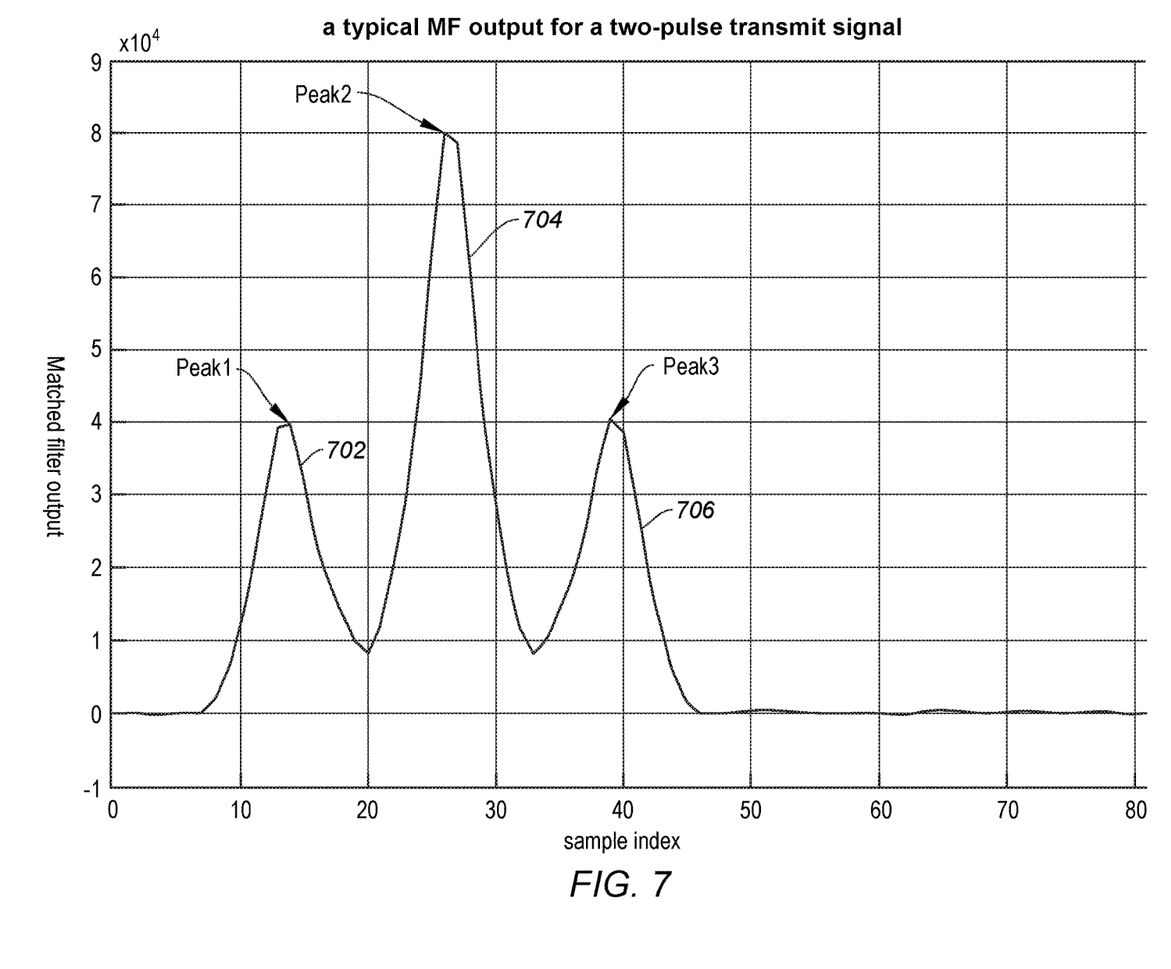
FIG. 7 is a graph of a matched filter output for processing a two-pulse laser pulse transmission from FIG. 6, according to certain embodiments.

FIG. 7 is a graph of a matched filter output for processing a two-pulse laser pulse transmission from FIG. 6 according to one embodiment. In one embodiment, the known signal, the emitted pulse waveform, is correlated with the received signal to detect the presence of the emitted signal in the received signal. In one embodiment, this is equivalent to convolving the received signal with a conjugated time-reversed version of the emitted signal. A variety of matched filters can be used, either in the time domain, or in the frequency domain after using a Fast Fourier Transform (FFT). As can be seen in FIG. 7, the convolution results in 3 peaks from the input two peaks. The Y axis shows the amplitude of the matched filter output, while the X axis shows the sample index. The sample index is the index of discrete time data samples in a sequence. For example, the first sample coming out of the ADC has a sample index 1, and the next sample has an index of 2.

In one embodiment, the matched filter processes received data by convoluting it with the reversal sequence of the transmit signal. Alternately, other types of matched filters may be used. The matched filter could be time-domain type or frequency-domain type matched filter. The matched filter can be a spread-spectrum matched filter, a pulse length matched filter, a parametric adaptive matched filter, an adaptive matched filter, a coherent or non-coherent matched filter, or other type of matched filter. If a frequency domain matched filter is used, depending on the environment, different frequencies may be susceptible to more noise than others. The frequencies with the most noise can vary as the vehicle moves.

Figure 8:
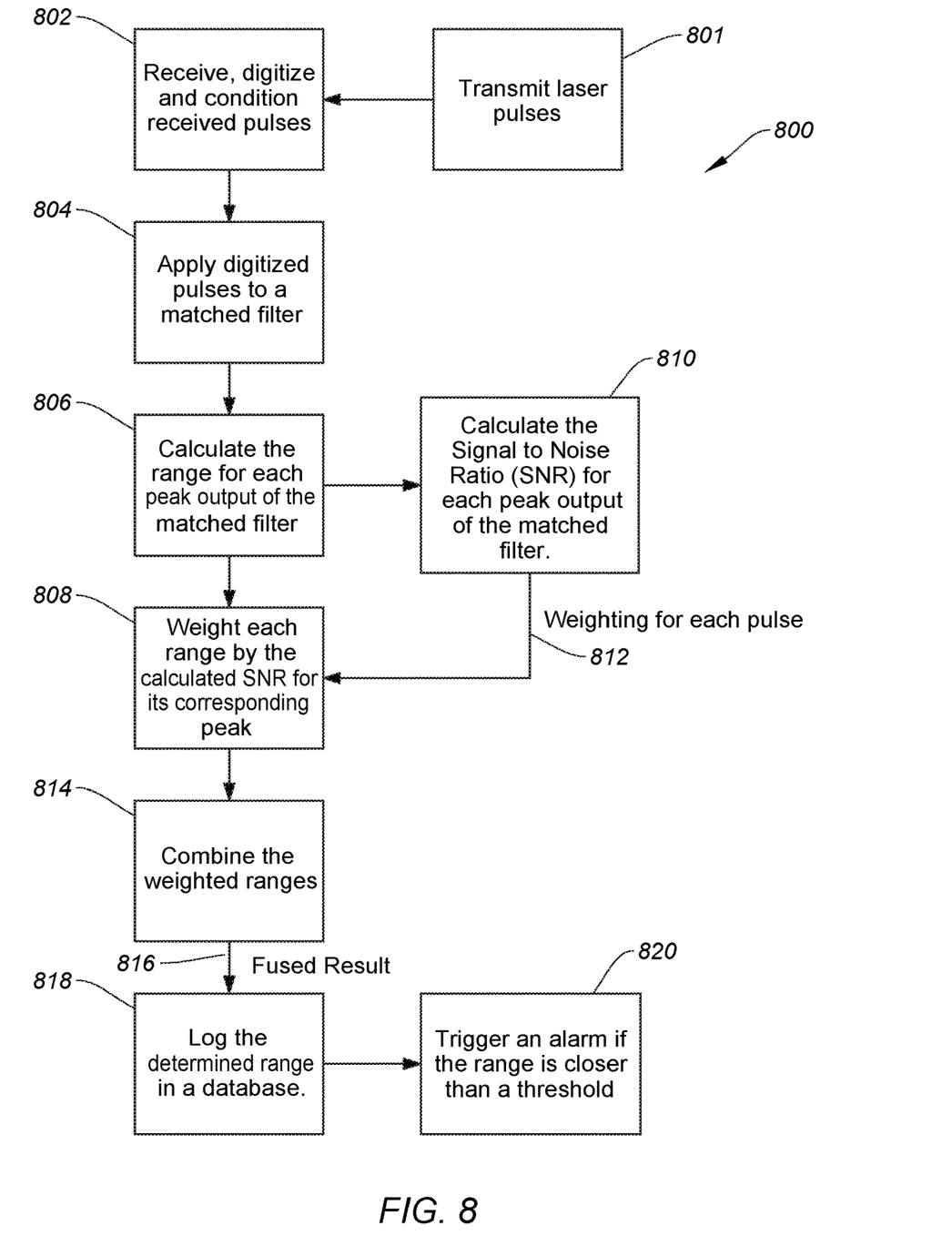
FIG. 8 is a simplified flow chart showing a method for detecting the range of an object using a LiDAR-based detection system, according to certain embodiments.

FIG. 8 is a simplified flow chart showing a method 800 for detecting the range of an object using a LiDAR-based detection system, according to certain embodiments. Method 800 may be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 800 can be performed by aspects of system 200 of FIG. 2, the system of FIG. 3, and or the system 900 of FIG. 9.

At operation 801, method 800 can include transmitting a first plurality of LiDAR laser pulses in a predetermined direction, according to certain embodiments. For example, light signal generator 230 may generate a laser pulse (e.g., 5 ns duration) and optics/emitter block 232 may emit the pulse in a predetermined direction (e.g., within a 360 degree planar FOV).

At operation 802, method 800 can include receiving a first LiDAR return signal from the predetermined direction, the first LiDAR return signal being a reflection of the first LiDAR send signal that has been reflected by an object, according to certain embodiments. In some cases, the first LiDAR return signal may have a smaller amplitude and be noisy as the signal may be subject to signal degradation, signal scattering (e.g., a portion is reflected), signal interference from other electromagnetic radiation, or other deleterious effects, as would be appreciated by one of ordinary skill in the art with the benefit of this disclosure. The return signal is multiple pulses if the transmitted signal is multiple pulses. The received signal is digitized and conditioned, such as with modules 324 and 326 of FIG. 3.

At operation 804, the received, digitized, conditioned signal has its digitized pulses applied to a matched filter. The matched filter uses as a template the original pulse waveform transmitted, or a reproduction of it. Through a convolution process, the output of the matched filter will have more peaks than the input.

At operation 806, method 800 can include determining a TOF measurement corresponding to a difference between a time that the first LiDAR send signal was sent and the first LiDAR return signal was received, according to certain embodiments. The TOF measurement is performed on each peak output from the matched filter, and used to determine a the range to the object using the TOF multiplied by the speed of light. For example, a counter in TOF detection module 234 may count the round trip of the first LiDAR signal from emission, reflection, and detection. In some cases, the counter may be enabled via a receive window that can set time boundaries of when a return signal is expected to arrive, which may typically be set to a time range that encapsulates an amount of time for detection at the maximum range. By way of example, method 800 may include starting a counter for a receive window when the first LiDAR send signal is sent and stopping the counter for the receive window then the first LiDAR return signal is received, where the difference between the time that the first LiDAR send signal was sent and the first LiDAR return signal was received corresponds to a difference between a time when the counter is started and stopped. For multiple transmitted pulses, multiple counters could be used, or the same counter can provide the TOF for each pulse. Alternately, the average transmission and reception time of the group of pulses could be used.

At operation 808, method 800 can include weighting the calculated range for each peak by the SNR as determined by operation 810. The calculated SNR is then used as a weighting factor for each peak.

At operation 814, method 800 can include combining the weighted ranges to provide a fused result. The combining can be done using equation (2) above, copied again below:

$$Rest=(SNR1*Rest1+SNR2*Rest2+SNR3*Rest3)/(SNR1+SNR2+SNR3) \quad \text{(Equation 2)}$$

Other equations could be used to produce a fused result. For example, another possible equation is:
for any M>=1 (the number of peaks)

$$Rest=(SNR_1*Rest_1+SNR_2*Rest_2+\ldots+SNR_M*Rest_M)/(SNR_1+SNR_2+\ldots+SNR_M) \quad \text{(equation 3)}$$

In one embodiment, a training set of data can be used to determine the coefficients and replace SNRs, SNR2, SNR3 by minimizing the mean square error of the Rest of the training set of data.

At operation 818, method 800 can include logging (storing) the range in a database. That range can be used for a variety of operational purposes. One of those purposes, set forth in operation 820, is triggering an alarm if the range shows an object is closer than a threshold.

It should be appreciated that the specific steps illustrated in FIG. 8 provide a particular method 800 for determining the range from a vehicle to an object. Other sequences of steps may also be performed according to alternative embodiments. That is, some embodiments may perform method 800 in a different order. For instance, some embodiments may similarly perform operations 801 (i.e., send first LiDAR send signal in a predetermined direction) and 802 (i.e., receive first LiDAR return signal form predetermined direction) in order, but may then deviate from the method as shown in FIG. 8. Any combination of changes can be used and one of ordinary skill in the art with the benefit of this disclosure would understand the many variations, modifications, and alternative embodiments thereof.

Exemplary Computer Systems Implementing Aspects of Embodiments Herein

Figure 9:
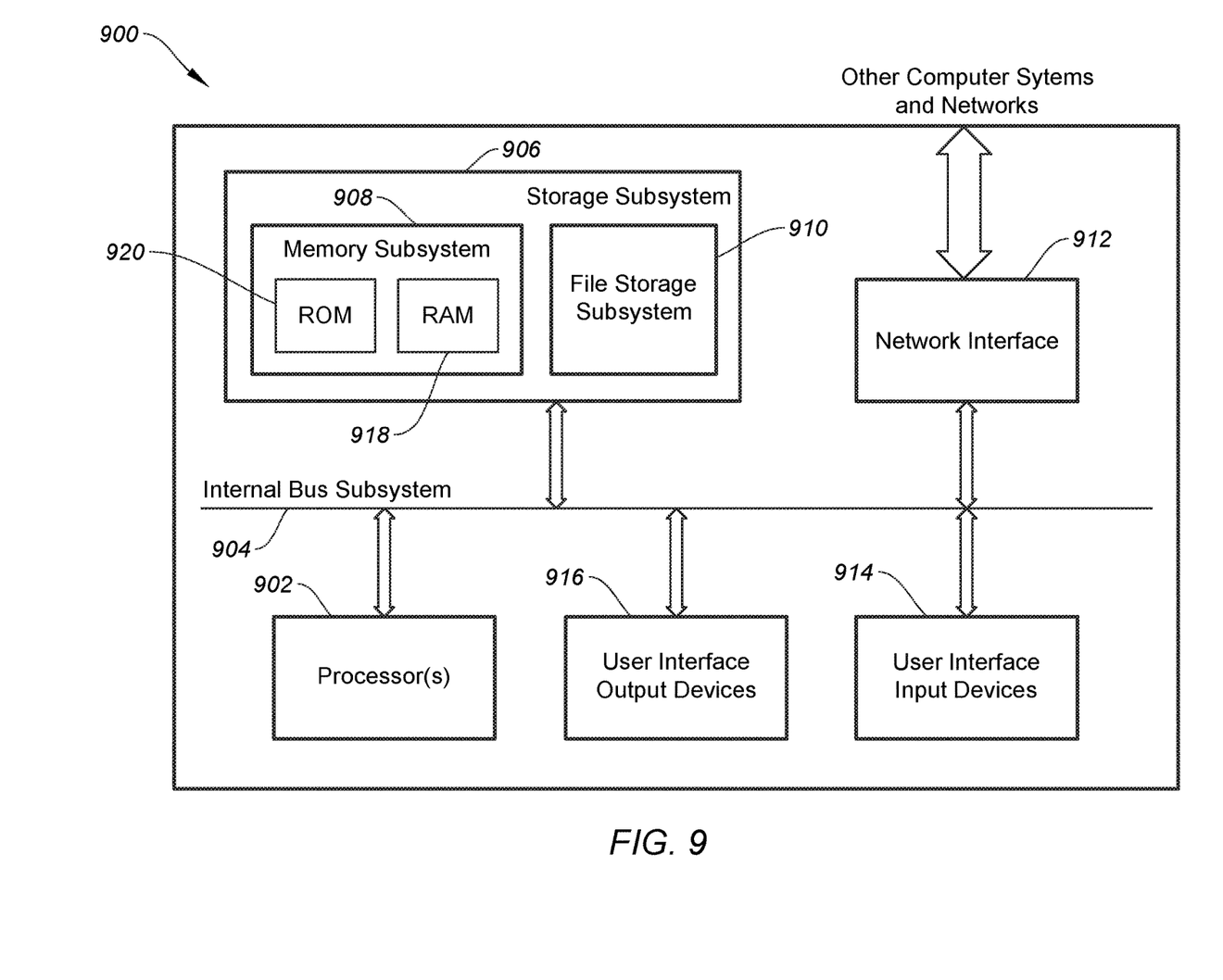
FIG. 9 shows a system for operating a LiDAR-based detection system, according to certain embodiments.

FIG. 9 is a simplified block diagram of computer system 900 configured to operate aspects of a LiDAR-based detection system, according to certain embodiments. Computer system 900 can be used to implement any of the systems and modules discussed above with respect to FIGS. 1-8. For example, computer system 900 may operate aspects of threshold control 280, TOF module 234, processor(s) 220, control system 240, or any other element of LiDAR system 200 or other system described herein. Computer system 900 can include one or more processors 902 that can communicate with a number of peripheral devices (e.g., input devices) via a bus subsystem 904. These peripheral devices can include storage subsystem 906 (comprising memory subsystem 908 and file storage subsystem 910), user interface input devices 914, user interface output devices 916, and a network interface subsystem 912.

In some examples, internal bus subsystem 904 (e.g., CAMBUS) can provide a mechanism for letting the various components and subsystems of computer system 900 communicate with each other as intended. Although internal bus subsystem 904 is shown schematically as a single bus, alternative embodiments of the bus subsystem can utilize multiple buses. Additionally, network interface subsystem 912 can serve as an interface for communicating data between computer system 900 and other computer systems or networks. Embodiments of network interface subsystem 912 can include wired interfaces (e.g., Ethernet, CAN, RS232, RS485, etc.) or wireless interfaces (e.g., ZigBee, Wi-Fi, cellular, etc.).

In some cases, user interface input devices 914 can include a keyboard, pointing devices (e.g., mouse, trackball, touchpad, etc.), a barcode scanner, a touch-screen incorporated into a display, audio input devices (e.g., voice recognition systems, microphones, etc.), Human Machine Interfaces (HMI) and other types of input devices. In general, use of the term "input device" is intended to include all possible types of devices and mechanisms for inputting information into computer system 900. Additionally, user interface output devices 916 can include a display subsystem, a printer, or non-visual displays such as audio output devices, etc. The display subsystem can be any known type of display device. In general, use of the term "output device" is intended to include all possible types of devices and mechanisms for outputting information from computer system 900.

Storage subsystem 906 can include memory subsystem 908 and file/disk storage subsystem 910. Subsystems 908 and 910 represent non-transitory computer-readable storage media that can store program code and/or data that provide the functionality of embodiments of the present disclosure (e.g., software 91-204). In some embodiments, memory subsystem 908 can include a number of memories including main random access memory (RAM) 918 for storage of instructions and data during program execution and read-only memory (ROM) 920 in which fixed instructions may be stored. File storage subsystem 910 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 900 is illustrative and not intended to limit embodiments of the present disclosure. Many other configurations having more or fewer components than system 900 are possible.

The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local-area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. However, computer-readable storage media does not include transitory media such as carrier waves or the like.

Figure 10:
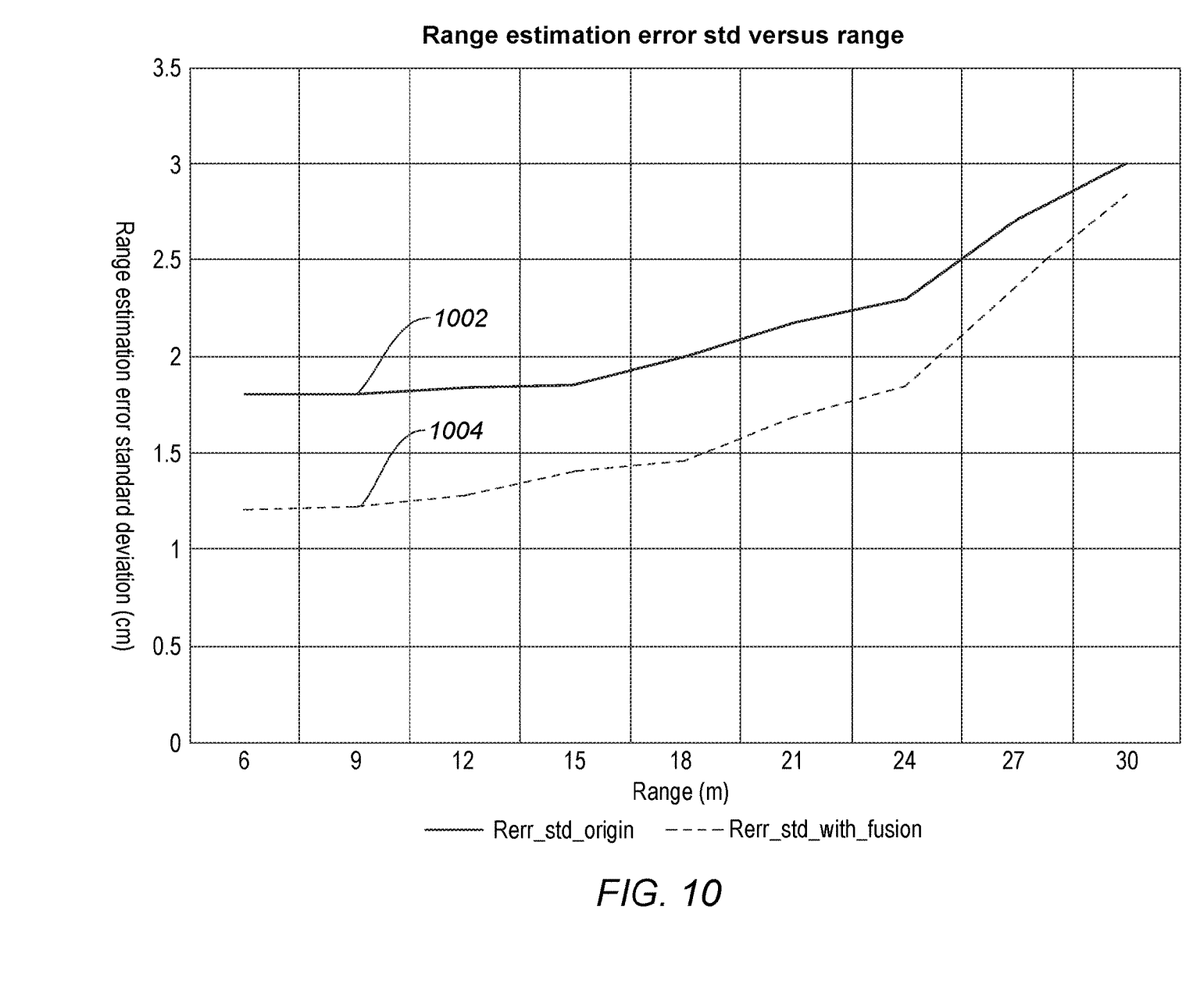
FIG. 10 is a graph of range error vs. distance comparing the prior art to certain embodiments.

FIG. 10 is a graph of range error vs. distance comparing the prior art to an embodiment of the present invention. The Y axis is the range estimation error standard deviation in centimeters. The X axis is the range in meters. Line 1002 shows the range estimation error standard deviation for a prior art technique. Line 1004 shows the range estimation error standard deviation for an embodiment of the present invention. As can be seen, for the range of most interest for vehicles (6-30 meters), the range estimation error standard deviation is better for the embodiment of the present invention, ranging from more than half a centimeter to about a quarter centimeter. The improvement of 0.25~0.5 centimeter is clearly a significant improvement as can be seen by putting it in the form of a ratio. For example, 0.5/1.8=30% improvement is significant. When a LiDAR has an range error standard deviation of 5 cm, for example, after employing the fusion algorithm, it could achieve about 3.5 cm standard deviation. A smaller range error standard deviation is critical for the consequential LiDAR perception algorithms to be successful and LiDAR perception is important for autonomous driving and advanced driver assistance system.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. A method for operating a light detection and ranging (LiDAR) system in an automobile, the method comprising:
   generating, by a logic circuit, a laser pulse group transmission trigger signal;
   transmitting, by a laser source in response to the laser pulse group transmission trigger signal, a transmitted plurality of laser pulses within a first time period;
   receiving, at a photodetector, a plurality of reflected pulses corresponding to the transmitted plurality of laser pulses as reflected off an object;
   amplifying the plurality of reflected pulses;
   converting, in an analog to digital converter, the plurality of reflected pulses into a plurality of digital reflected pulses;
   processing, in a matched filter, the plurality of digital reflected pulses using convolution with a replica of the transmitted plurality of laser pulses to improve a signal to noise ratio and producing a higher number of output peaks than the plurality of reflected pulses;
   determining the signal-to-noise ratio (SNR) for each of the output peaks;
   determining, in a processor, a range to the object from each of the output peaks;
   weighting, in the processor, the range to the object from each of the output peaks by a corresponding signal to noise ratio for each of the output peaks to provide a plurality of weighted ranges;
   combining, in the processor, the weighted ranges to provide an final determined range to the object; and
   using the final determined range to control an aspect of the automobile.

2. The method of claim 1 wherein the transmitted plurality of laser pulses are in the infrared frequencies.

3. The method of claim 1 wherein there are at least 3 output peaks and the combining is performed using an equation which includes (SNR1*Rest1+SNR2*Rest2+SNR3*Rest3)/(SNR1+SNR2+SNR3), where SNR1 is a signal-to-noise ratio (SNR) of a first peak, SNR2 is a SNR of a second peak, SNR3 is a SNR of a third peak, and Rest is the estimated range.

4. The method of claim 3 wherein the matched filter uses convolution.

5. The method of claim 1 wherein the transmitted plurality of laser pulses comprises a waveform having 2-5 peaks.

6. The method of claim 1 further comprising marking the final determined range as a point on a two dimensional point graph; and
   repeating the claim elements of claim 1 multiple times for a plurality of objects to create a two dimensional collection of points that are dynamically and continuously updated in real-time, forming a point cloud.

7. The method of claim 1 wherein the matched filter comprises a time domain matched filter.

8. The method of claim 7 wherein the matched filter is a finite impulse response filter in the digital domain that uses a conjugate reversal of the transmitted plurality of laser pulses as filter coefficients.

9. A light detection and ranging (LiDAR) apparatus for an automobile, the apparatus comprising:
   a logic circuit having an output laser pulse group transmission trigger signal;
   a laser source, coupled to the logic circuit, having a laser output that transmits a plurality of laser pulses within a first time period in response to the output laser pulse group transmission trigger signal;
   a photodetector positioned to receive a plurality of reflected pulses corresponding to the plurality of laser pulses as reflected off an object;
   an amplifier, coupled to the photodetector to amplify the reflected pulses;
   an analog to digital converter coupled to the amplifier to convert the reflected pulses into digital reflected pulses;
   a matched filter coupled to the analog to digital converter to use convolution to compare the digital reflected pulses with a replica of the transmitted plurality of laser pulses to improve a signal to noise ratio and producing a higher number of output peaks than the number of reflected pulses;

a processor configured to determine the signal-to-noise ratio (SNR) for each of the output peaks;

non-transitory, computer readable code, embedded on media accessible by the processor, to determine a range to the object from each of the output peaks;

the non-transitory, computer readable code further being operable to weight the range to the object from each of the output peaks by a corresponding signal to noise ratio for each of the output peaks to provide a plurality of weighted ranges; and the non-transitory, computer readable code further being operable to combine the weighted ranges to provide a final determined range to the object.

10. The apparatus of claim 9 wherein the transmitted plurality of laser pulses are in the infrared frequencies.

11. The apparatus of claim 9 wherein there are at least 3 output peaks and the computer readable code operable to combine the weighted ranges combines using an equation which includes (SNR1*Rest1+SNR2*Rest2+SNR3*Rest3)/(SNR1+SNR2+SNR3), where SNR1 is a signal-to-noise ratio (SNR) of a first peak, SNR2 is a SNR of a second peak and SNR3 is a SNR of a third peak, and Rest is the estimated range.

12. The apparatus of claim 11 wherein the matched filter uses convolution.

13. The apparatus of claim 11 wherein the transmitted plurality of laser pulses comprises a waveform having 2-5 peaks.

14. The apparatus of claim 11 wherein the matched filter comprises a time domain matched filter.

15. The apparatus of claim 11 wherein the matched filter is a finite impulse response filter in a digital domain that uses a conjugate reversal of the transmitted plurality of laser pulses as filter coefficients.

16. The apparatus of claim 11 wherein the code for calculating the SNR further comprises code for processing each output peak by dividing each output peak amplitude value by an RMS value of the noise.

17. A method comprising:

generating, by a logic circuit, a laser pulse group transmission trigger signal;

transmitting, by a laser source in response to the laser pulse group transmission trigger signal, at least one transmitted laser pulse within a first time period;

receiving, at a photodetector, at least one reflected pulse corresponding to the transmitted pulse as reflected off an object;

converting, in an analog to digital converter, the reflected pulse into a digital reflected pulse;

processing, in a matched filter, the digital reflected pulse using convolution with a replica of the transmitted laser pulse to produce a plurality of output peaks;

determining the signal-to-noise ratio (SNR) for each of the output peaks;

determining, in a processor, a range to the object using a fusion of the peaks and weighting, in the processor, by a corresponding SNR for each of the output peaks to provide a plurality of weighted numbers;

combining, in the processor, the weighted numbers to provide an final determined range to the object.

18. The method of claim 17 wherein the matched filter comprises a time-domain type matched filter.

19. The method of claim 18 wherein the matched filter is a finite impulse response filter in the digital domain that uses a conjugate reversal of the transmitted laser pulse as filter coefficients.

20. The method of claim 17 wherein the SNR is determined by processing each output peak by dividing each output peak amplitude value by an RMS value of a detected noise.

* * * * *